United States Patent
Bowyer

(10) Patent No.: US 11,748,325 B2
(45) Date of Patent: *Sep. 5, 2023

(54) SYSTEM AND METHOD FOR GENERATING MULTICATEGORY SEARCHABLE TERNARY TREE DATA STRUCTURE

(71) Applicant: CERNER INNOVATION, INC., Kansas City, KS (US)

(72) Inventor: Jonathon William Bowyer, Kansas City, MO (US)

(73) Assignee: Cerner Innovation, Inc., Kansas City, MO (US)

( * ) Notice: Subject to any disclaimer, the term of this patent is extended or adjusted under 35 U.S.C. 154(b) by 18 days.

This patent is subject to a terminal disclaimer.

(21) Appl. No.: 17/647,039

(22) Filed: Jan. 5, 2022

(65) Prior Publication Data

US 2022/0129431 A1   Apr. 28, 2022

Related U.S. Application Data

(63) Continuation of application No. 16/717,454, filed on Dec. 17, 2019, now Pat. No. 11,269,836.

(51) Int. Cl.
*G06F 16/22* (2019.01)
*G06F 16/245* (2019.01)

(52) U.S. Cl.
CPC ...... *G06F 16/2246* (2019.01); *G06F 16/2264* (2019.01); *G06F 16/245* (2019.01)

(58) Field of Classification Search
CPC . G06F 16/2246; G06F 16/2264; G06F 16/245
See application file for complete search history.

(56) References Cited

U.S. PATENT DOCUMENTS

| | | |
|---|---|---|
| 7,194,468 B1 | 3/2007 | Bacila et al. |
| 8,150,891 B2 | 4/2012 | Luk et al. |
| 9,143,392 B2 | 9/2015 | Duchesneau |
| 9,659,109 B2 | 5/2017 | Hiwale et al. |
| 9,953,058 B1 | 4/2018 | Sadri |
| 9,953,085 B1 | 4/2018 | Collins et al. |
| 10,216,627 B1 | 2/2019 | Givargis |
| 2001/0025320 A1 | 9/2001 | Seng et al. |
| 2003/0084038 A1 | 5/2003 | Balogh et al. |
| 2003/0093613 A1 | 5/2003 | Sherman |

(Continued)

OTHER PUBLICATIONS

Aashish Bamwal, "Ternary Search Tree", website, GeeksforGeeks, Jan. 16, 2013, 9 pages.<https://www.geeksforgeeks.org/ternary-search-tree/> Retrieved by the Internet Wayback Machine on Jan. 7, 2020 at <https://web.archive.org/web/20130116093951/https://www.geeksforgeeks.org/ternary-search-tree/>.

(Continued)

*Primary Examiner* — James E Richardson
(74) *Attorney, Agent, or Firm* — Invoke

(57) ABSTRACT

Systems, methods, and computer-readable media are disclosed herein that generate a ternary tree data structure that includes multiple categories (e.g., terminologies) using dynamic array modifications that facilitate sharing of one or more nodes across categories. A plurality of different categories may be added and stored within a single ternary tree data structure such that each categories may be separately queried using the single ternary data structure.

22 Claims, 6 Drawing Sheets

(56) References Cited

U.S. PATENT DOCUMENTS

| | | |
|---|---|---|
| 2004/0267732 A1 | 12/2004 | Luk et al. |
| 2006/0235882 A1 | 10/2006 | Mateescu et al. |
| 2007/0255747 A1* | 11/2007 | Lee .................... G06F 16/48 707/999.102 |
| 2008/0244531 A1 | 10/2008 | Schmelter et al. |
| 2010/0110936 A1 | 5/2010 | Bailey et al. |
| 2011/0184893 A1 | 7/2011 | Paparizos et al. |
| 2011/0320498 A1 | 12/2011 | Flor |
| 2014/0136543 A1 | 5/2014 | Frieden et al. |
| 2015/0347436 A1 | 12/2015 | Hiwale et al. |
| 2016/0203196 A1 | 7/2016 | Schnall-Levin et al. |
| 2017/0185325 A1 | 6/2017 | PabÓn et al. |
| 2019/0034472 A1 | 1/2019 | Evens et al. |
| 2021/0182260 A1 | 6/2021 | Bowyer |

OTHER PUBLICATIONS

Jon Bentley and Bob Sedgewick, "Ternary Search Trees", website, Dr. Dobb's Journal, Dec. 24, 2018, 9 pages. <https://www.cs.upc.edu/ps/downloads/tst/tst.html>.

Praneeth Harsha, "Multidimensional Arrays in Java", website, GeeksforGeeks, Jan. 25, 2019, 11 pages.<https://www.geeksforgeeks.org/multidimensional-arrays-in-java/> Retrieved by the Internet Wayback Machine on Jan. 7, 2020 at <https://web.archive.org/web/20190125042000/https://www.geeksforgeeks.org/multidimensional-arrays-in-java/>.

* cited by examiner

SYSTEM AND METHOD FOR GENERATING MULTICATEGORY SEARCHABLE TERNARY TREE DATA STRUCTURE

CROSS-REFERENCE TO RELATED APPLICATION

This application is a continuation that claims the benefit of priority to non-provisional U.S. application Ser. No. 16/717,454, entitled "System and Method for Generating Multi-category Searchable Ternary Tree Data Structure" and filed on Dec. 17, 2019, the entirety of which is incorporated by reference herein.

BACKGROUND

A ternary tree is a specialized data structure that supports incremental string searching applications such as, for example, automated computerized spell-checking and term auto-completion in text (e.g., full or partial words, phrases). In a ternary tree, there is a root node that serves as the base of the ternary tree and which does not have a parent node. Nodes are generally connected to one another using a pointer. Each node may be connected, by a pointer, to zero (i.e., null) child nodes or up to three child nodes.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The present invention is defined by the claims as supported by the Specification, including the Detailed Description.

In brief and at a high level, this disclosure describes, among other things, methods, systems, and computer-readable media for generating a single ternary tree data structure that corresponds to multiple different terminologies using dynamic, nested arrays that facilitate sharing of one or more nodes across terminologies, as described hereinafter.

A computerized method is provided herein. The computerized method comprises generating a ternary tree using a first terminology that comprises one or more terms, and the one or more terms comprise one or more characters, in embodiments. The ternary tree comprises a first plurality of nodes, in embodiments, and the first plurality of nodes correspond to the one or more characters. In embodiments, the first plurality of nodes are arranged to represent the one or more terms of the first terminology. The method further comprises adding a second terminology to the ternary tree, wherein the second terminology comprises one or more additional terms, and the one or more additional terms comprise the one or more characters, in embodiments. Adding the second terminology to the ternary tree comprises, in some embodiments, reusing one or more of the first plurality of nodes to represent the one or more characters for the one or more additional terms of the second terminology.

Another embodiment provides one or more non-transitory computer-readable media having computer-readable instructions embodied thereon that, when executed, perform a method. In embodiments, a first plurality of terms of a first terminology are identified, wherein the first plurality of terms comprise a first plurality of characters. In some embodiments, a first plurality of nodes are generated and are arranged to represent the first plurality of terms. In embodiments, each node in the first plurality of nodes corresponds to one of the first plurality of characters, and the first plurality of nodes form a ternary tree. Each node of the first plurality of nodes has a corresponding array that stores a first nested array, and the first nested array stores a term match number that is specific to the first terminology for that particular node, in some embodiments. In one embodiment, a second plurality of terms of a second terminology are identified. The second plurality of terms comprise a second plurality of characters. In some embodiments, at least a portion of the second plurality of characters match a portion of the first plurality of characters. Continuing, a portion of the first plurality of nodes in the ternary tree is determined to correspond to the portion of the second plurality of characters that match the portion of the first plurality of characters, in some embodiments. In some embodiments, a second plurality of nodes are generated and are arranged to represent the second plurality of terms in the ternary tree. Each node in the second plurality of nodes corresponds to one of the second plurality of characters, and each node of the second plurality of nodes has a corresponding array that stores a term match number, in embodiments. In various embodiments, the ternary tree includes the first and second plurality of nodes arranged to represent the first terminology and the second terminology.

In yet another embodiment, one or more non-transitory computer-readable media having computer-executable instructions embodied thereon that, when executed, perform a method. The method comprises performing a string query in a ternary tree, in embodiments, wherein the ternary tree comprises a plurality of nodes that represent at least a first and second terminology. The method further comprises determining the string query is designated for the first terminology, in embodiments. The plurality of nodes are traversed in the ternary tree based on the string query, in one embodiment. A first search result corresponding to the string query is located, in some embodiments, wherein the first search result corresponds to a node having an array, where the array stores at least a term match number of the first terminology. In embodiments, the first search result that is specific to the first terminology is returned.

BRIEF DESCRIPTION OF THE DRAWINGS

Embodiments are described in detail below with reference to the attached drawings figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Conventional ternary tree data structures do not permit multiple categories to be stored within a single ternary tree. Instead, conventional technologies are limited such that only one category is capable of being stored in one ternary tree at a given time. As such, conventional technologies require that a separate ternary tree be created and used for each search category.

In contrast, the embodiments herein provide for the generation of a searchable ternary tree that stores multiple categories (e.g., terminologies being a type of category) within the single searchable ternary tree. In order to generate a single ternary tree that stores multiple categories within itself, embodiments herein provide for one or more nodes in the ternary tree to be reused and shared across more than one category. As such, data that is common between two or more categories may be represented using a reused or shared node within the single ternary tree.

Embodiments herein generate a ternary tree using a first terminology that comprises one or more terms. Each term generally corresponds to a word, and the term comprises a specific sequence of one or more characters. For example, the term "cat" may be formed using a specific sequence of the alphanumeric characters "c," "a," and "t." In another example, the term "camp" may be formed using a specific sequence of the alphanumeric characters "c," "a," "m," and "p." It will be understood that roman alphanumeric characters are discussed herein for simplicity only and are not to be construed as limiting the characters, terms, terminologies, and ternary tree discussed herein. As such, other non-roman characters (e.g., Cyrillic, Greek, Arabic, Hebrew, Japanese, Korean, Tamil, and Thai alphabets) may be used and are contemplated to be within the scope of the invention. Also, it will be understood that, while characters are discussed herein for simplicity and are not to be construed as limiting, a node may represent or correspond to a non-character such as an object or a pointer to an object.

Figure 1:
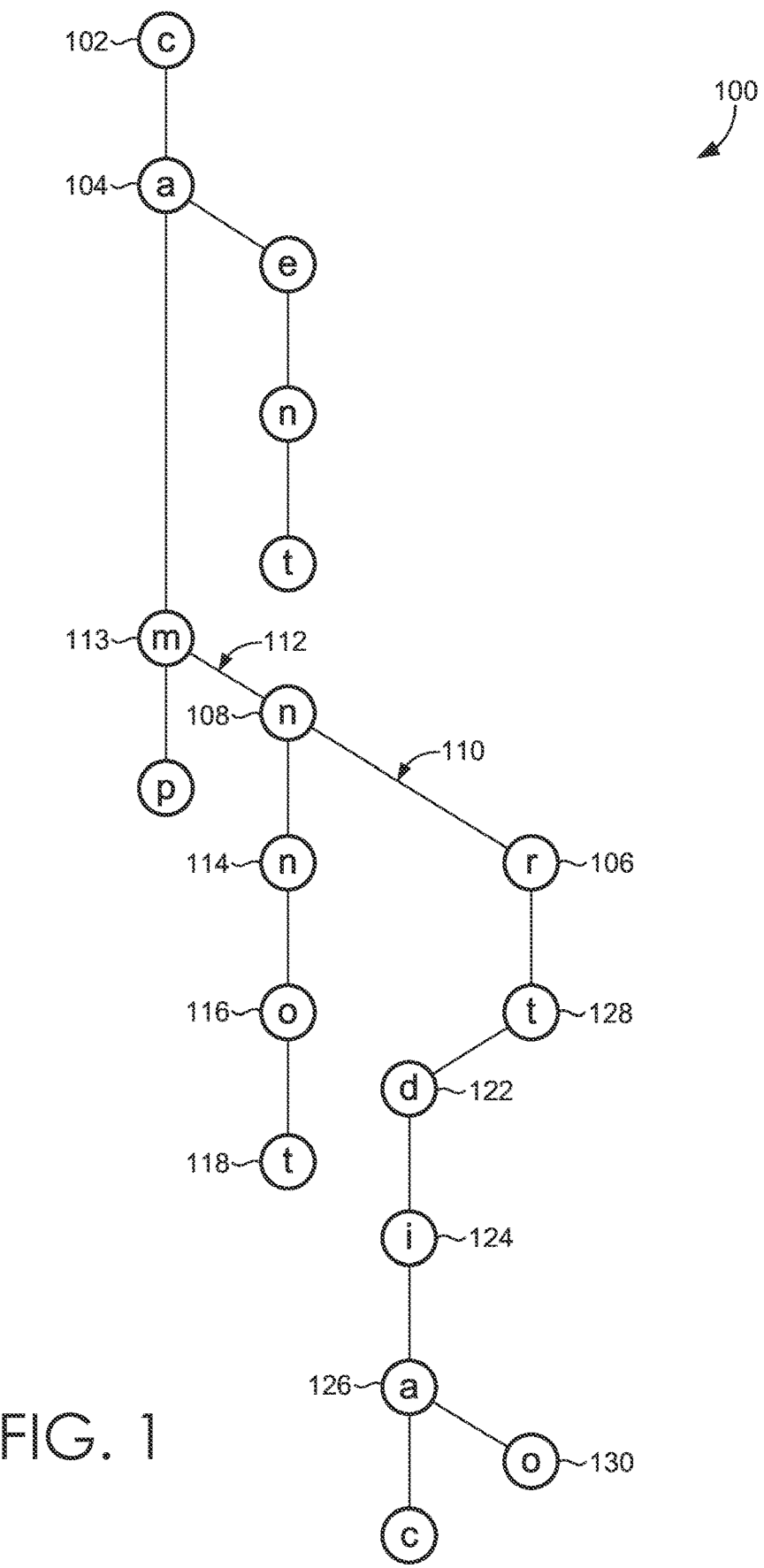
FIG. 1 is a diagram of an example data structure in accordance with embodiments of the present invention.

A simplified example of a ternary tree 100 is shown in FIG. 1. For example, a ternary tree may have 100+ or beyond 100,000+ nodes. In the ternary tree 100, a plurality of nodes are generated for the first terminology and each of the nodes corresponds to one of the characters. For example, the node 102 corresponds to the character "c" and another node 104 corresponds to the character "a," while yet another node 106 corresponds to the character "r." Node 108 corresponds to the character "n," in the example. Generally, as shown in FIG. 1, the plurality of nodes are arranged to represent one or more terms of the first terminology. Each of the nodes may be connected to one or more other node(s) using a pointer, also interchangeably referred to as a directed edge. Pointers are generally represented using an angled or vertical line as shown in FIG. 1. For example, a first pointer 110 connects node 108 ("n") to node 106 ("r") while a second pointer 112 connects node 108 ("n") to node 113 ("m"). Accordingly, when an incremental string query is performed to search the ternary tree 100, the nodes may be followed from node to node via pointers, to identify search results such as the terms "cart" and "cardio." Generally, a "high pointer" points to a character, as represented by a node, whose value is greater than the current node and a "low pointer" points to a character, as represented by a node, whose value is less than the current node. An "equal pointer" is represented as a vertical line, which points to a character, as represented by a node, whose value is equal to the current node.

In embodiments herein, and unlike conventional technologies, a second terminology is added to the same ternary tree that includes the first terminology. The second terminology generally includes at least one term that is different or in addition to the terms of the first terminology. In some embodiments, the first and second terminologies may share one or more of the same terms. In one embodiment, the first and second terminologies share less than 50% overlap in their terms. In various embodiments, the second terminology comprises one or more additional terms (relative to the first terminology) that may not be present and may be added into the ternary tree. The one or more additional terms comprise one or more characters, in embodiments, such that the same alphanumeric characters are generally shared between the first and second terminologies. For example, the first and second terminologies may both comprise terms that are represented or "spelled" using the same characters (e.g., letters "a" through "z" in the English language).

In adding the second terminology to the same ternary tree that includes the first terminology, one or more of the first plurality of nodes are reused in order to represent the one or more characters for the one or more additional terms of the second terminology. In one example, shown in FIG. 1 in the ternary tree 100, node 102 ("c"), node 104 ("a"), and node 108 ("n") may correspond to the term "can" of the first terminology and the same nodes are reused to correspond to the term "cannot" of the second terminology, where the characters of the terms of the two different terminologies at least partially overlap. In this example, node 114 ("n"), node 116 ("o"), and node 118 ("t") are added to the ternary tree 100 to represent the term "cannot" of the second terminology. All of the nodes corresponding to the term "cannot" are connected by pointers. In another example, in the ternary tree 100, the node 102 ("c"), node 104 ("a"), and node 106 ("r") were previously added to represent the term "cart" of the first terminology and these nodes may be reused to correspond to at least a portion of the term "cardiac" of the second terminology, where the characters of the different terms of the different terminologies at least partially overlap. In this example, node 122 ("d"), node 124 ("i"), and node 126 ("a"), etc., have been added to the ternary tree 100 to represent the term "cardiac" in the second terminology. All of the nodes corresponding to the term "cardiac" are connected by pointers.

In a further example, a third terminology may be added to the same ternary tree by reusing each of node 102 ("c"), node 104 ("a"), node 106 ("r"), node 122 ("d"), and node 124 ("i") while adding a new node 130 ("o") to represent the term "cardio" of the third terminology. In yet another example, in the ternary tree 100, node 102 ("c"), node 104 ("a"), node 106 ("r") and node 128 ("t") may correspond to the term "cart" of the first terminology and the same nodes may be reused to correspond to the term "cart" of the second terminology, where the term of the two different terminologies is the same. In this example, no additional nodes are added to the ternary tree for the term but instead the nodes are reused for both the first and second terminologies, as further explained hereinafter.

At a high level, a second terminology (or any number of additional terminologies) are added to the same ternary tree by determining whether a node exists for a character (e.g., "o") of a particular term (e.g., "cardio") in the second terminology. When the node is present (e.g., the five nodes representing the sequence of characters "cardi" are present in the ternary tree 100 since the first terminology included the term "cardiac"), the arrays for the existing nodes are resized such that the existing nodes are reused, or shared by more than one terminology in the ternary tree. When a node for a character of a term of the second terminology is absent from the ternary tree (e.g., an "o" child node is absent under the parent "i" node in the ternary tree 100), a new node is inserted for the character of the term of the second terminology. In this way, nodes are added to a ternary tree as needed, while existing nodes are reused. Accordingly, embodiments herein provide for the generation and use of a single searchable ternary tree that stores multiple categories (e.g., terminologies) by reusing and sharing nodes across more than one category.

After the ternary tree 100 has been generated and multiple terminologies are added, the ternary tree 100 may be searched, as further described herein. As should be understood by those persons having an ordinary level of skill in the particular art, when a search is performed, each node is evaluated and all branches from are node are evaluated in the ternary tree 100 are searched. For example, in searching the ternary tree for a term, the search generally moves from node to node through the ternary tree 100, beginning from a root node. In one example, regarding the string "cam," the search would obtain the corresponding array (including any nested arrays as further discussed hereinafter) at node 113 ("m"). Then, the search may proceed to the next level in the ternary tree 100, by examining all available children of node 113 ("m") include the middle child node that represents the character "p." Finally, the search may identify the node "p" has zero child nodes, and the search would stop or be considered complete. In this example, the search would obtain the corresponding array (including a nested array as further discussed hereinafter) for that node representing the character "p." In the example, when returning a search result such as "camp," the corresponding array (including any nested array and stored value(s) as further discussed hereinafter) for the terminal node "p" may serve as the term match number(s).

Figure 2:
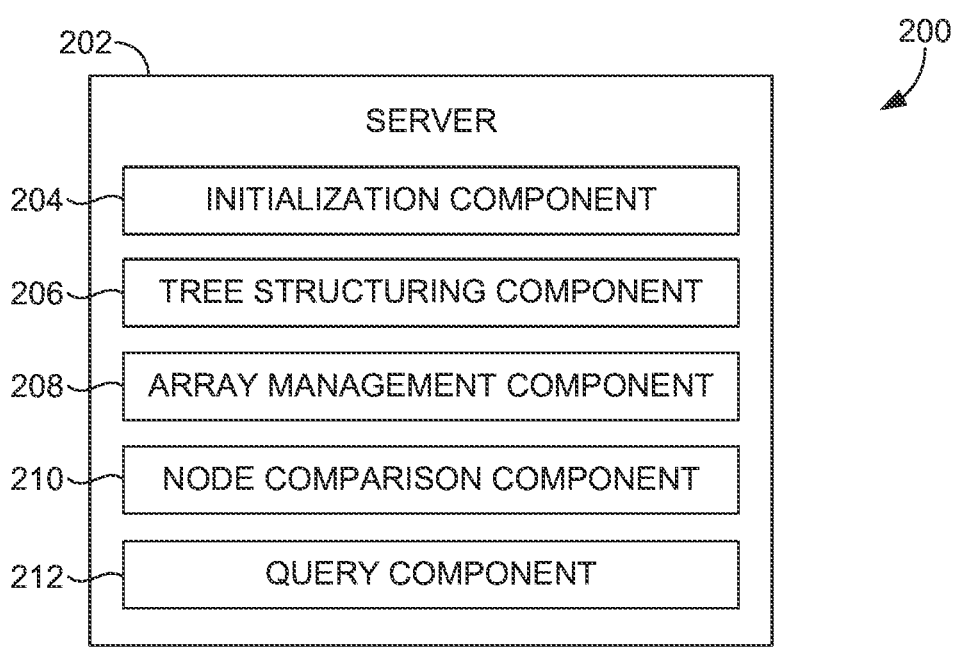
FIG. 2 is a block diagram of an example system in accordance with an embodiment of the present invention.

Turning to FIG. 2, an example system 200 is shown in accordance with an embodiment of the present invention. In some embodiments, the system 200 comprises a server 202. In embodiments, the server 202 comprises an initialization component 204, a tree structuring component 206, an array management component 208, a node comparison component 210, and a query component 212. The server 202 may be a physical server or a virtual server, or a set or a collection of physical servers and/or virtual servers, in some embodiments. In such embodiments, the server(s) may communicate with one another over a network, and the server(s) may operate in a distributed networking environment. The server(s) may communicate locally with one another, in one embodiment, such that the server(s) may operate within a localized networking environment.

In some embodiments, the initialization component 204 is configured to identify a first plurality of terms of a first terminology, wherein the first plurality of terms comprise a first plurality of characters. In embodiments, the tree structuring component 206 is configured to build a ternary tree data structure by generating a first plurality of nodes that are arranged to represent the first plurality of terms. Each node in the first plurality of nodes corresponds to one of the first plurality of characters, in embodiments. Each node of the first plurality of nodes has a corresponding array that stores a term match number for the corresponding character, in some embodiments, as stored by the tree structuring component 206. As used herein, a "term match number" generally refers to any integer, including zero, but may refer to a null value. In embodiments, each term match number references a list of terms for the terminology.

In various embodiments, the initialization component 204 is configured to identify a second plurality of terms of a second terminology, wherein the second plurality of terms comprise a second plurality of characters and at least a portion of the second plurality of characters match at least a portion of the first plurality of characters (e.g., shared alphabet). The node comparison component 210 is configured to determine whether a portion of the first plurality of nodes corresponds to that particular portion of the second plurality of characters that matches the portion of the first plurality of characters, in embodiments. The portion of the first plurality of nodes (which is determined to match) may be reused to represent one or more terms of the second terminology, as further discussed herein. For the portion of the first plurality of nodes to be shared or reused, the array management component 208, in embodiments, is configured to automatically resize the array of each node in the portion of the first plurality of nodes to be shared or reused. For example, the array management component 208 may increase the array size by expanding the array boundary to nest one or more inners arrays within the outer array, for each of the reusable nodes.

For example, within an outer array for one reusable node, one or more term match numbers for a first terminology may be stored in a first nested array and one or more term match numbers for a second terminology may be stored in a second nested array. The one or more term match numbers in the second nested array include information for the second terminology, for example. The array management component 208 may work with the tree structuring component to add one or more term match numbers for the additional nested arrays (e.g., second nested array, third nested array) placed within the outer arrays of the nodes, as well as for creating new nodes that are added in the ternary tree for the subsequent terminology.

For example, the tree structuring component 206 is configured to generate a second plurality of nodes that are arranged to represent the second plurality of terms in the ternary tree. Each node in the second plurality of nodes corresponds to one of the second plurality of characters, and each node in the second plurality of nodes has a corresponding array that stores a term match number. The second plurality of nodes are generated for those characters in the terms of the second terminology that are absent from the ternary tree, in embodiments. Generally, the second plurality of nodes that are added to the ternary tree are those nodes that are not being reused or shared between the first and second terminologies. Accordingly, the newly added nodes corresponding to terms that are, at least, partially absent from the first terminology.

Subsequently, after two or more terminologies have been added to the ternary tree by repeating the actions above for each term in each terminology, and subsequent to rendering the ternary tree immutable, the query component 212, in embodiments, is configured to execute string queries against the ternary tree and use the term match values in nested inner arrays, for example, to locate positions in terminology-specific lists as search results.

Figure 3:
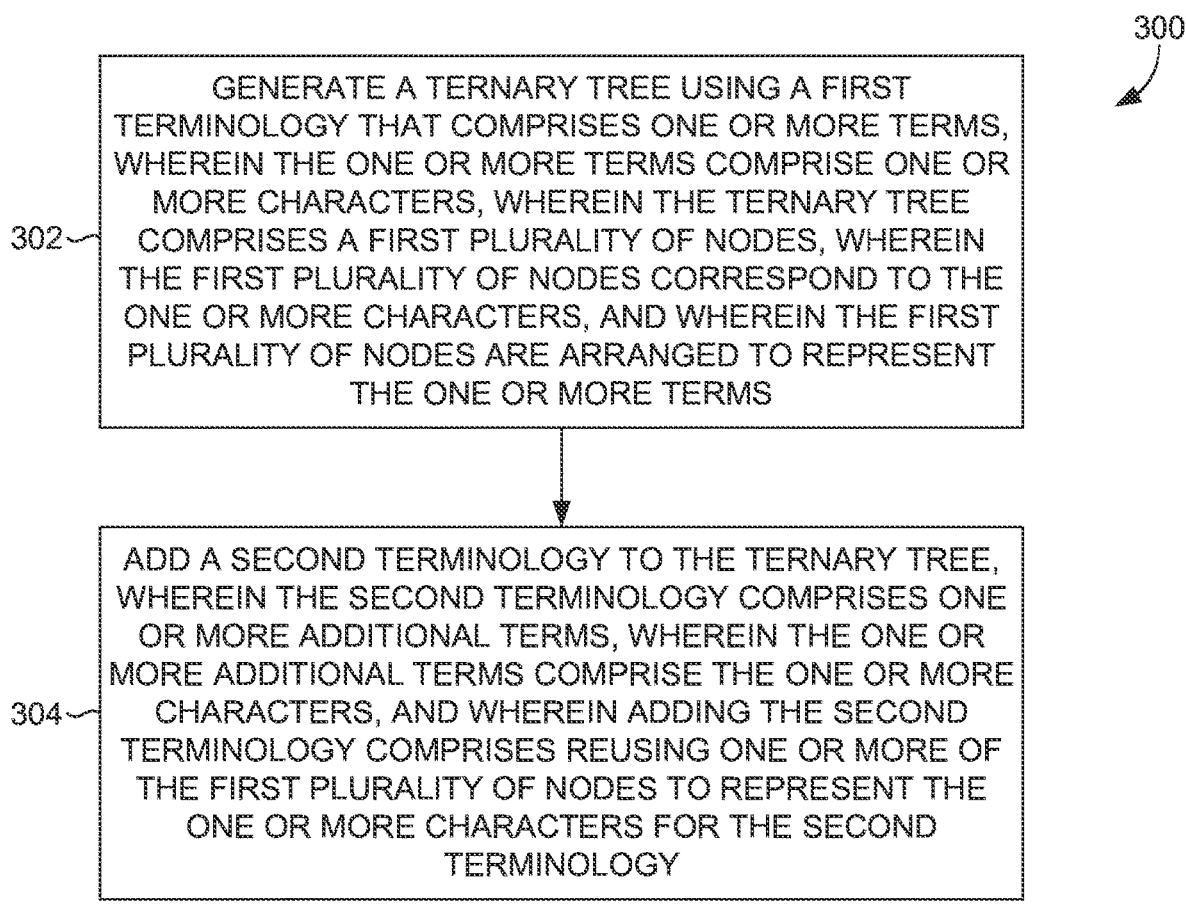
FIG. 3 is a flow diagram showing an example method in accordance with an embodiment of the present invention.
Figure 4:
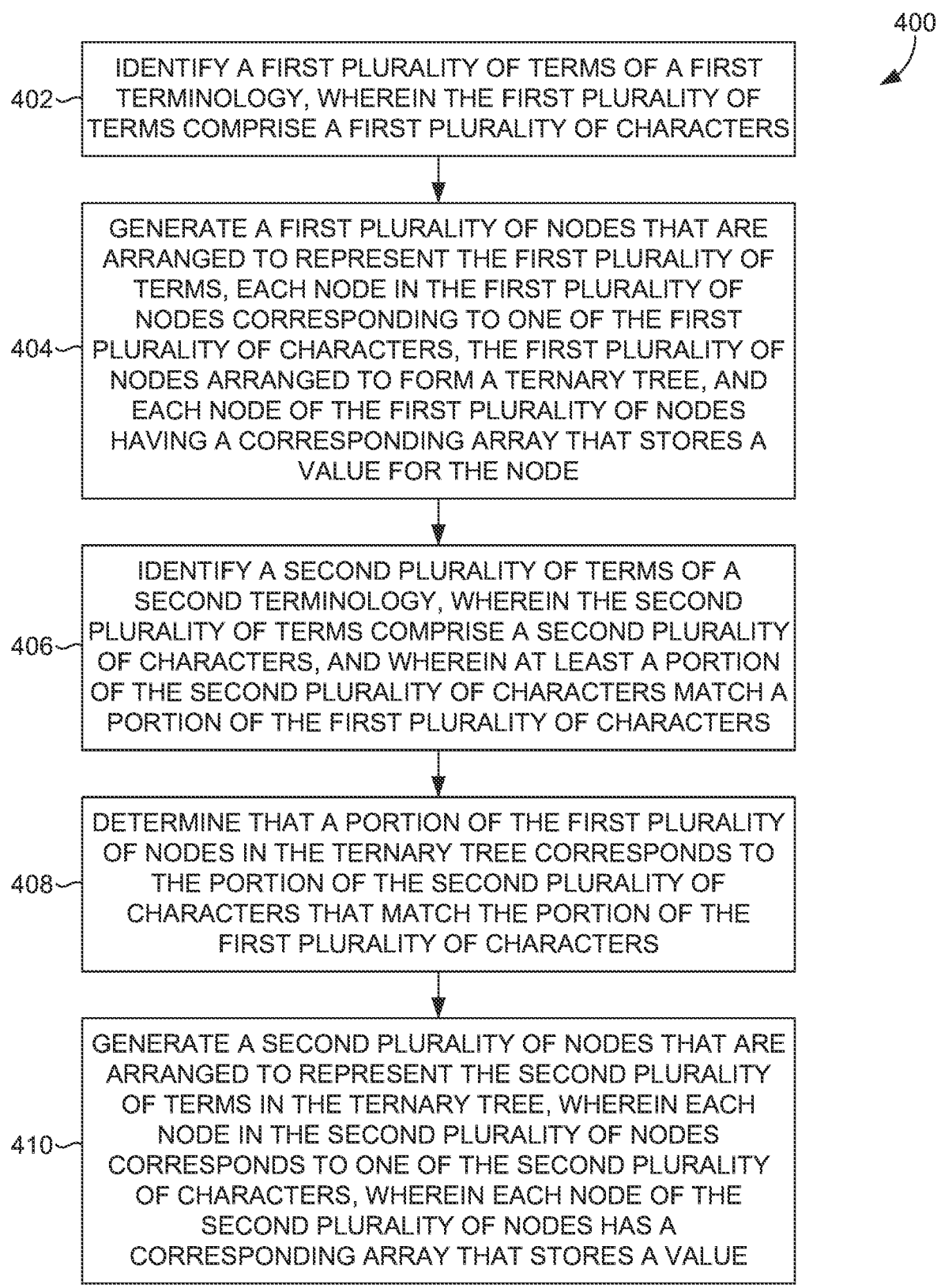
FIG. 4 is a flow diagram showing an example method in accordance with an embodiment of the present invention.
Figure 5:
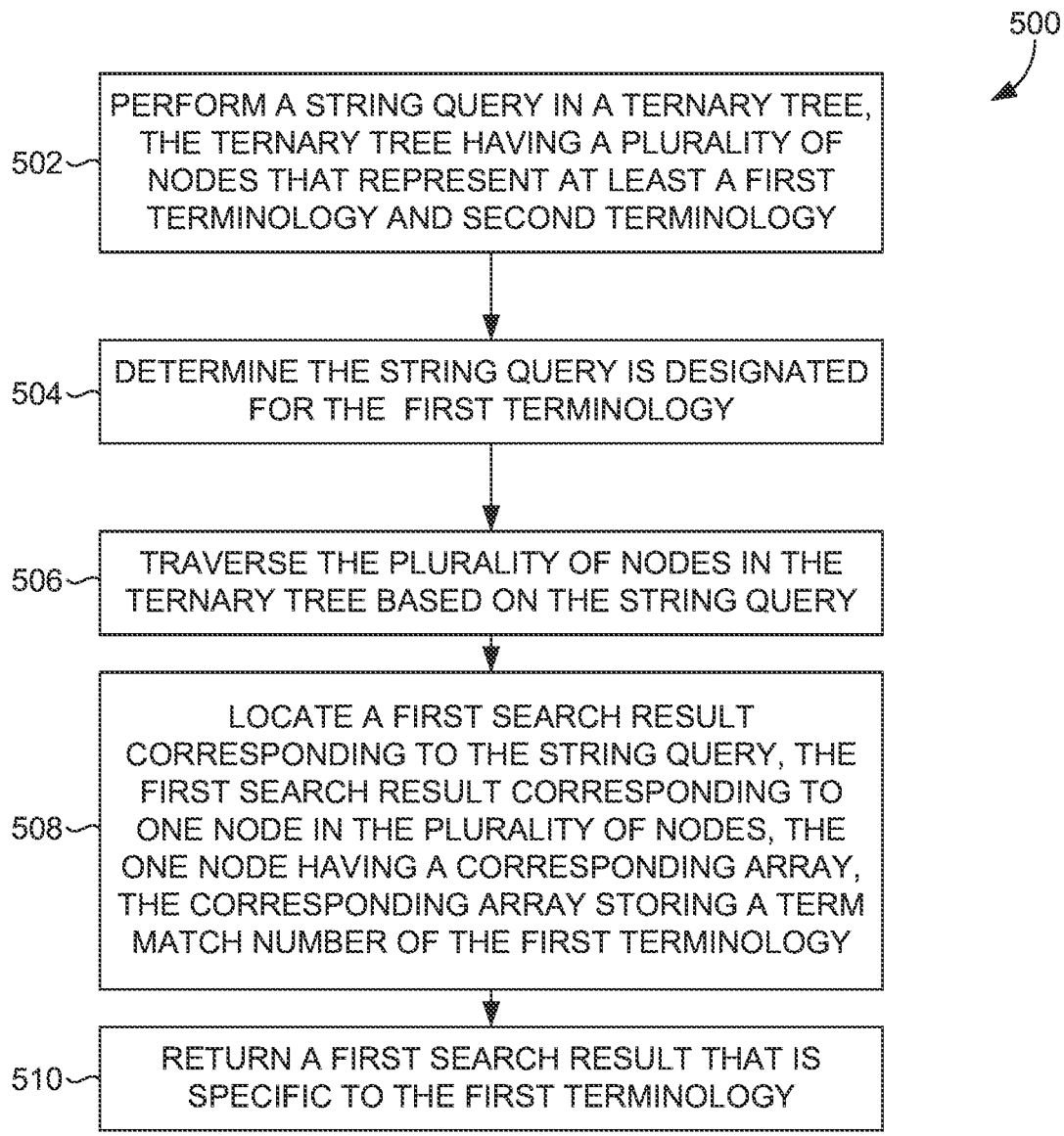
FIG. 5 is a flow diagram showing an example method in accordance with an embodiment of the present invention.

Continuing to FIGS. 3-5, methods are discussed that can be performed via one or more of the components and component interactions previously described in FIG. 2. As such, the methods are discussed briefly for brevity, though it will be understood that the previous discussion can be applicable to aspects of the methods of FIGS. 3-5. In various embodiments, one or more non-transitory computer-readable storage media having computer-readable instructions or computer-readable program code portions embodied thereon, for execution via one or more processors, may be executed to implement and/or perform one or more of the methods shown in FIGS. 3-5. For example, computer-readable instructions or computer-readable program code portions can specify the performance of the methods, can specify a sequence of steps of the methods, and/or can identify particular component(s) of a software and/or hardware for performing one or more of the steps of the methods, in embodiments. The computer-readable instructions or computer-readable program code portions can correspond to an application plugin or an application programming interface (API), in some embodiments. In one embodiment, the plugin or API can implement and/or perform the methods. As discussed below, the methods can be performed using any and all of the software, hardware, component(s), and/or device(s) shown in FIGS. 2 and 6.

FIG. 3 presents a flow diagram of an example method 300 for generating a ternary tree comprising multiple categories (e.g., terminologies). Beginning at block 302, a ternary tree is generated by using a first terminology that comprises one or more terms to generate a first plurality of nodes. In embodiments, the one or more terms comprise one or more characters. In one example, the first terminology is a SNOMED terminology having 300,000+ terms and/or concepts. In generating the ternary tree, a first plurality of nodes are generated and correspond to the one or more characters, and the first plurality of nodes are arranged to represent the one or more terms, in embodiments. For example, each of the nodes in the plurality may represent one letter of an alphabet, and letters may be reused throughout the ternary tree. In another example, each of the nodes in the plurality may be arranged, by connecting nodes using pointers, to form sequences of letters that spell the one or more terms. In one embodiment, the first plurality of nodes are arranged to represent the one or more terms of the first terminology by connecting each of first plurality of nodes using a high pointer, an equal pointer, and/or a low pointer to at least one other node.

At block 304, a second terminology is added to the ternary tree, in embodiments. For example, one or more nodes are added to the ternary tree to represent one or more terms of the second terminology, and the one or more terms comprise the one or more characters. The one or more terms of the second terminology generally comprise the one or more characters, such that, for example, the first and second terminologies share an alphabet. In embodiments, the second terminology comprises one or more terms that are absent from the first terminology. As such, these new terms or additional terms of the second terminology are added to the ternary tree as a second plurality of nodes. In one example, the second terminology is an ICD-10-CM/PCS terminology while the first terminology comprises a SNOMED terminology. In this example, the terms of the ICD-10-CM/PCS terminology are added as a second plurality of nodes to the same ternary tree that includes the first plurality of nodes created for the SNOMED terminology. It will be understood that these medical terminologies are discussed as examples only and are not to be construed as limiting the categories, terms, terminologies, characters, and ternary tree of embodiments herein. Any number and kind of terminology may be used in embodiments herein for generating a ternary tree comprising multiple categories (e.g., terminologies) via reusable nodes.

In some embodiments, adding the second terminology comprises reusing one or more of the first plurality of nodes to represent one or more characters for the second terminology. As mentioned in regard to the example ternary tree 100 of FIG. 1, node 102 ("c"), node 104 ("a"), and node 106 ("r") were added to represent the term "cart" of the first terminology and these nodes may be reused to correspond to the term "cardiac" of the second terminology, where the characters of the terms of the two different terminologies at least partially overlap. In that example, node 122 ("d"), node 124 ("i"), and node 126 ("a"), etc., are added to the ternary tree to represent the term "cardiac" in the second terminology.

In embodiments, adding the second terminology to the ternary tree comprises determining that one or more of the first plurality of nodes in the ternary tree (i.e., from the terms of the first terminology) correspond to the one or more characters of the one or more terms of the second terminology. These one or more of the first plurality of nodes may be reused. Such that the reusable nodes support searches of both the first and second terminology. However, one or more terms of the second terminology may not be represented by the first plurality of nodes in the ternary tree.

In an embodiment, adding the second terminology to the ternary tree may comprise determining whether one or more of the first plurality of nodes in the ternary tree correspond to the one or more characters of the one or more additional terms of the second terminology. In one embodiment, adding the second terminology to the ternary tree may comprise inserting a new node into the ternary tree when one or more of the first plurality of nodes in the ternary tree do not correspond to the characters of at least one term of the second terminology. These new nodes are not reused or shared with the first terminology, for example. The process of adding terminologies can be repeated to add any number of terminologies to the ternary tree.

Continuing, FIG. 4 provides a method 400 for generating a ternary tree comprising multiple categories (e.g., terminologies) via reusable nodes. In accordance with the method 400, a first plurality of terms of a first terminology is identified at block 402, wherein the first plurality of terms comprise a first plurality of characters. At block 404, a first plurality of nodes are generated and are arranged to represent the first plurality of terms such that each node in the first plurality of nodes corresponds to one of the first plurality of characters. In embodiments, the first plurality of nodes form a ternary tree, based on the arrangement of the parent nodes and child nodes, connected by pointers. Each node of the first plurality of nodes has a corresponding array that stores one or more term match numbers for the node, in embodiments. For example, as only the first terminology is presently represented in the ternary tree data structure in the method 400, each node in the ternary tree has a corresponding array that stores one array (e.g., size one).

At block 406, a second plurality of terms of a second terminology are identified, wherein the second plurality of terms comprise a second plurality of characters. In some embodiments, one or more of the second plurality of terms may be the same as, or similar to, one or more of the first plurality of terms. In a further embodiment, two or more of the second plurality of terms may be the same as, or similar to, two or more of the first plurality of terms. In embodiments, one or more of the second plurality of terms may be different from the first terminology, such that the one or more of the second plurality of terms are absent from the first terminology. These one or more terms of the second terminology are new terms or additional terms that are absent from the first terminology. As such, the ternary tree, at that time in the method 400, may not include nodes that correspond in arrangement to the new terms of the second terminology. Generally, at least a portion of the second plurality of characters match at least a portion of the first plurality of characters, such that, for example, the first and second plurality of characters correspond to the same, or to a similar, alphabet.

The terms of the second terminology may then be added to the ternary tree. For each term, the ternary tree is traversed from the root node to parent nodes to child nodes, traversing the pointers. For example, in order to add the term "cardio" of the second terminology, the ternary tree is traversed to locate a node "c" followed (directly or indirectly) by a child node "a" and further followed by a child node "r" and so on, in an effort to locate the term in the ternary tree. Accordingly, the nodes for the characters "c," "a," and "r" of the first terminology as arranged in the ternary tree correspond to the characters "c," "a," and "r" in the term "cardio" of the second terminology.

Thus, at block 408, a portion of the first plurality of nodes in the ternary tree are determined to correspond to the portion of the second plurality of characters that matches the portion of the first plurality of characters. Based on the portion of the first plurality of nodes in corresponding to the "matching" portion of the second plurality of characters, the portion of the first plurality of nodes may be reused when adding the terms of the second terminology to the one ternary tree, in embodiments. For example, when adding the second terminology to the ternary tree, the nodes of the ternary tree are traversed in order to locate whether each of the terms of the second terminology is already present in the ternary tree, based on the presence and sequence of characters arranged in the first plurality of nodes. When the first and second terminology share a particular term, all of the nodes for that particular term are located in the first plurality of nodes that are arranged to form the term within the ternary tree, for example. As such, at least some portion of the first plurality of nodes in the ternary tree are determined to correspond to the particular term, which is at least a portion of the second plurality of characters that match the portion of the first plurality of characters (e.g., characters of existing nodes match the characters of a term from the second terminology). Based on the matching characters arranged to form the particular term, the term of the second terminology is determined to exist in the ternary tree. As such, no new nodes are added to the ternary tree to represent that specific term for the second terminology, in embodiments. The portion of the first plurality of node that corresponds to the matching first and second plurality of characters are nodes that are reused and "shared" by the first and second terminologies.

In embodiments, when a node exists for a desired character of a term for the second terminology, the corresponding array for that node is automatically resized to facilitate node reuse or node sharing across terminologies. Accordingly, when the node exists for the desired character of the term begin added to the ternary tree for the second terminology, the boundaries or "size" of the array for that node is determined. Prior to resizing, the existing array for the node has a current boundary or size (e.g., the array stores one or more matches for that node for the first terminology, [9, 12, 62]), for example. The array is automatically resized to a new size of that is at least one array size larger than before (e.g., the array stores one or more matches for that node for the second terminology, [7, 29, 62], as well as the one or more matches for that node for the first terminology, [9, 12, 62]), in embodiments. When resizing the array, the boundary of the array is made at least one size larger, in embodiments. The resized includes two arrays nested into the original array, in this example, such that the array appears as [[9, 12, 62] [7, 29, 42]]. In some embodiments, the array is automatically resized by multiplying the size of the current array by a ratio of 1.5 (e.g., array of size one is multiplied by 1.5 to create the resize array).

In embodiment, the first nested array stores one or more matches for that node for the first terminology, and the second nested array one or more matches for that same node for the second terminology. However, both arrays are nested into the corresponding resized array for the reusable node. Accordingly, the corresponding resized array may appear as an outer set of brackets, where each inner array has its own set of brackets, such that the numbers inside each set of brackets correspond to one or more term matches for that particular node, and each set of inner brackets corresponds to a different terminology, in some embodiments. Thus, in embodiments, when resizing an array for any number of subsequently added terminologies, the current array for a node is copied, including the one or more numbers for term matches that are stored in the corresponding array (including nested arrays) at that time. The corresponding array is resized to be at least one size larger (e.g., an inner array is inserted as denoted by a new set of brackets containing new numbers for term matches), in embodiments. For example, the one or more copied term match numbers of the first array are inserted into the resized array along with a new second nested array with new numbers for the new terminology.

In addition to automatically resizing an array to add additional inner nested arrays for newly added terminologies, additional term match numbers may be added within an inner nested array to reflect additional term matches as the terms are added to the ternary tree. For example, the inner nested array for a terminology may be resized from having two term match numbers (e.g., second nested array [7, 29]) to having three term match numbers (e.g., second nested array [7, 29, 42]) when a third term of the second terminology is added to the ternary tree with a match at the node.

Accordingly, in embodiments, when one or more of the first plurality of nodes in the ternary tree are determined to correspond to one or more characters of one or more terms of the second terminology, the existing array of said one or more nodes that store at least one term match number for the first terminology in a first nested array is copied. Then, in one such embodiment, the existing array(s) of each of the one or more of the first plurality of nodes are replaced with new array(s) that are nested within the outer array. Each new resized array has a first nested array that stores term match number(s) denoting one or more term matches for the first terminology. Additionally, each new resized array also includes a second nested array that stores term match number(s) denoting one or more term matches for the second terminology, in various embodiments. In this way, the node is reused and shared by both terminologies by resizing the outer corresponding array of the node. As one node corresponds to one character, a node may be reused for the same term in both the first and second terminologies, or may be reused for different terms of each of the first and second terminologies, where the different terms share at least one character.

In embodiments, any number of terminologies may be added to the ternary tree. For example, as a new terminology is subsequently added to the ternary tree (e.g., a third terminology being subsequently added to the ternary tree after the second terminology, and after the first terminology), a corresponding outer array may again be automatically resized to a new size (e.g., three nested arrays). Accordingly, a node may be reused so that the corresponding array of n can be resized to an array size of n multiplied by at least one (e.g., any integer of 1 or greater, such as 1, 1.5, 2) for each new terminology that is added when a node exists for a desired character of a term in the new terminology, in embodiments. Generally, "n" refers to any integer (including zero of a null node/array) representing the number of inner nested arrays within the corresponding node-specific array. In one example, the identified node has a corresponding array of size n, and the corresponding array is updated in size to be n multiplied by at least one in order to store the one or more term match numbers for that node in a first nested array for the first terminology and the one or more term match numbers for the node in a second nested array for the second terminology.

In one embodiment, the method 400 identifies the corresponding array n that stores the term match number for the first terminology, and may update the corresponding array to a size that is n multiplied by 1.5, in order to enlarge the corresponding array. In such an embodiment, updating the corresponding array to a size that is n multiplied by 1.5 may comprise copying the corresponding array n that stores the term match number(s) for the first terminology and further, inserting the term match number(s) for the first terminology into a first nested array within the corresponding array of n multiplied by 1.5. Further, term match number(s) may be added to a second nested array within the corresponding array of n multiplied by 1.5. Thus, as enlarged, the method 400 may store, within the corresponding array, the term match number for the first terminology in a first nested array and the term match number for the second terminology in a second nested array.

However, for one or more other terms in the second terminology, a node for a character may be absent (i.e., the next desired character in a sequence for spelling a particular term is not present in a child node and/or is absent as a child node). When a node is absent such that the term of the second terminology is absent from the ternary tree, a node for the absent character is added or inserted into the ternary tree as a child node from the parent node, as linked by a pointer. A second plurality of nodes may be added one-by-one for each absent character of a term until the term is spelled within the ternary tree for the second terminology. This process of adding or inserting new nodes, and of automatically resizing node arrays for existing nodes, may be repeated for each and every term of a second terminology that is being added to the ternary tree.

In embodiments, information is stored that indicates which of one or more terminologies have been entered into or added to the ternary tree, and that further indicates the order in which each of the one or more terminologies were added to the ternary tree. In this manner, the information is usable to determine that, for a particular node, a first nested array corresponds to the first terminology and that a second nested array corresponds to the second terminology, for example. In one example, when five different terminologies have been added to the ternary tree, each of the nodes that are shared by all five terminologies may have an outer corresponding array with five inner nested arrays, and each of the inner arrays may have one or more term match numbers for a respective terminology. Further, in one such example, the order of the five nested arrays reflects the sequence or order in which the five terminologies were added to the ternary tree.

At block 410, a second plurality of nodes are generated that are arranged to represent at least at portion of the second plurality of terms in the ternary tree, wherein each node in the second plurality of nodes corresponds to one of the second plurality of characters. In embodiments, each node of the second plurality of nodes has a corresponding array that stores a term match number. The second plurality of nodes are generated for one or more characters for one or more terms of the second terminology that are determined to be absent from the ternary tree, in embodiments. Generally, the second plurality of nodes that are added to the ternary tree are those nodes that are not being reused or shared between the first and second terminologies. For example, the second plurality of nodes that are generated correspond to the second plurality of terms and do not correspond to the first plurality of terms in the ternary tree. In embodiments, when each of the second plurality of nodes is added or inserted into the ternary tree, a corresponding array for the node is created having a size of n, and the corresponding node may comprise one array. In this example, the corresponding node for the term of the second terminology is such that the first nested array corresponds to the second terminology.

It should be understood from this description that the use of the terms "first," "second," and "third" with regard to the terminologies and nested arrays are not to be construed as limiting the information stored in that array to, respectively, the first, second, and third terminologies. Instead, the terms "first," and "second" and "third" generally references the sequence in which terminologies are entered and matched to the term and character for that particular node. For example, the first nested array within any given array corresponds to information for the particular terminology which resulted in the generation or insertion of the node into the ternary tree (i.e., could be any of a first, second, third, etc., terminology). As mentioned prior, in other nodes that are shared by the first and second terminologies, the first nested array may store a term match number for the first terminology and the second nested array may store a term match number for the second terminology, in one example.

In another example, for one or more nodes that are shared by the first and a third terminology but not by a second terminology, the first nested array may store one or more term match numbers for the first terminology, the second nested array may store a null value and/or is an empty array, and the third nested array may store one or more match numbers for the third terminology. In yet another example, for one or more nodes that are shared by the second and a third terminology but not by a first terminology, the first nested array may store a null value and/or is an empty array, the second nested array may store one or more term match numbers for the second terminology, and the third nested array may store one or more term match numbers for the third terminology. Thus, the sequence of the nested arrays within the whole array for the node (i.e., the outer array brackets) reflects a sequence of the entry of terminologies that match the specific node.

Accordingly, using the method 400, the one ternary tree is generated that includes the first and second plurality of nodes arranged to represent the first terminology and the second terminology, wherein a portion of the first plurality of nodes are reused to represent characters for terms in the first and second terminology. Further, in embodiments, the one ternary tree includes the first and second plurality of nodes arranged to represent the first terminology and the second terminology, wherein the second plurality of nodes that were inserted are not reused and represent characters for those terms that only belong to the second terminology. As stated hereinabove, any number and kind of terminology may be added to the ternary tree wherein some portion of nodes may be reused for some or all of the terminologies, and wherein some other portion of nodes may be reused for only one or only some of the terminologies. Further, in some embodiments, a portion of the nodes may not be reused, such that some portion of the nodes may be specific to only one of the multiple terminologies in the ternary tree.

In further embodiments, any number of terminologies may be added to the ternary tree. For example, a third terminology may be added to the ternary tree after the second terminology, which was after the first terminology. In such further embodiments, the method 400 may identify a third plurality of terms of a third terminology. The third plurality of terms may include a third plurality of characters that match at least a portion of the first plurality of characters. The method 400 may determine that a second portion of the first plurality of nodes as arranged in the ternary tree corresponds to the third plurality of characters that match a portion of the third plurality of characters, in one embodiment. Accordingly, the second portion of the first plurality of nodes are reused to represent the third plurality of characters of the third plurality of terms of the third terminology (i.e., shared characters between the third terminology and the first terminology). Also, in some embodiments, a third plurality of nodes are generated and are arranged to represent at least a portion of the third plurality of terms in the ternary tree. In such embodiments, the ternary tree includes the first, second, and third plurality of nodes arranged to represent the first, second, and third terminologies.

Prior to using a ternary tree to perform a string search (e.g., querying the ternary tree for a term in a string search using the query component 212 of FIG. 2), in embodiments, the ternary tree is "frozen" in order to fix the placement of all nodes for all terminologies in the multi-category ternary tree. A ternary tree may be frozen using a line command, in embodiments. Generally, the line command "calls" a method on the ternary tree and the ternary tree is made thread-safe and immutable (i.e., nodes can no longer be added or inserted, or deleted or removed from the ternary tree). As part of freezing the ternary tree, all of the nodes are analyzed such that null arrays are removed, empty arrays are modified so that all empty arrays point to a single constant 'empty' reference, and/or arrays are trimmed, in some embodiments. Once the ternary tree has been frozen and thus made thread-safe, the one ternary tree can be used to search one or more, or all, of the terminologies present in the ternary tree, in embodiments.

FIG. 5 presents a flow diagram of an example method 500 for searching a ternary tree comprising multiple categories (e.g., terminologies) via reusable nodes. At block 502, the method 500 comprises performing or otherwise initiating a string query in a ternary tree, the ternary tree having a plurality of nodes that represent at least a first terminology and second terminology. The method 500 further determines, at block 504, that the string query is designated for the first terminology, in some embodiments. Then, when performing the string query in the ternary tree, in an embodiment, the query begins at the root (node) and makes a comparison at each node to identify whether the character to which the node corresponds is a match for a character in the string query.

At block 506, the plurality of nodes in the ternary tree are traversed based on the string query, in embodiments. For example, when the first character "c" in the string query "cardio" has been matched to a node that corresponds to "c," the query continues to the next level down in the ternary tree, from that matching "c" node to one or more child nodes branching off the matching node, in an effort to match the second character "a" in the string query "cardio" to locate a node that corresponds to "a." At each match, the query continues to the child nodes below the "a" node, for example, until the nodes matching the characters and the sequence of the characters is located in the ternary tree, in the example. The nodes are traversed unless or until a node that corresponds to the last character "o" of the string query "cardio" has been located.

At block 508, a first search result corresponding to the string query is located. The first search result corresponds to a node in the plurality of nodes, the node having a corresponding array for the first terminology. Generally, locating the first search result corresponding to the string query comprises traversing one or more pointers between the plurality of nodes and performing comparisons. For example, the node corresponds to a character that matches the last or terminal character "o" in the string query "cardio." The array that corresponds to the node stores a term match number that is specific to the first terminology, in embodiments. In some embodiments, each of one or more inner arrays for one node may store multiple term match numbers, for example, an inner nested array may store term match numbers that are specific to a particular terminology within the ternary tree. Accordingly, in an embodiment, the specific term match number(s) that corresponds to the first terminology in the first nested array is/are identified and selected instead of other term match number(s) in a second nested array that is specific to the second terminology, for that one node. For example, the first nested array may be selected for return, as corresponding to the string query based on the string query designating the first terminology. As such, when the string query is specific to a particular terminology, the one or more term match numbers in a nested array that correspond to the particular terminology is chosen for returning search results, in an embodiments. In some embodiments, based on the string query designating the first terminology, a term match number in a first nested array that is specific to the first terminology is used for returning search results. In a similar manner, based on a string query designating the second terminology, the term match number in a second nested array that is specific to the second terminology is used for returning search results, in one embodiment. At block 510, the first search result that is specific to the first terminology is returned. The first search may comprise one or more term match numbers from a specific nested array, in various embodiments.

When returning a first search results, the term match number in a nested array for a character-matched node may be returned as being specific to the first terminology. Generally, each term match number references a list of terms for the particular terminology to which the nested array corresponds. For example, where the first nested array specifies [9, 12, 62], the term located at position 9, the term located at position 12, and the term located at position 62, within a list of terms for the first terminology are all retrieved as the search results.

In further embodiments, within the same tree, a subsequent string query is performed, wherein the subsequent string query indicates to return a result that is specific to the second terminology. In this further example, a second search result that is specific to the second terminology is returned. Specifically, the nodes are traversed unless or until a node that corresponds to the last character of the subsequent string query has been located. The outer array for that particular node is located, and the inner nested array that is specific to the second terminology within that array is returned as a second search result for subsequent string query.

When returning a second search result, the term match number in a nested array for a character-matched node may be returned as being specific to the second terminology. Generally, each term match number references a list of terms for the particular terminology to which the nested array corresponds. For example, where the second nested array specifies [7, 29, 42], the term located at position 7, the term located at position 29, and the term located at position 42, within a list of terms for the second terminology are all retrieved as the search results.

As such, in embodiments, the first search result for the first string query corresponds to an inner nested array for term(s) belonging to the first terminology, and the second search result for the subsequent string query corresponds to another inner nested array for term(s) belonging to second terminology, yet both search results were supported and provided using a single ternary tree. By relying on the nested two-dimensional arrays that correspond to nodes, and which can store multiple terminology-specific nested arrays, the ternary tree stores multiple terminologies in one tree while supporting terminology specific queries. In yet a further embodiment, the plurality of nodes may further represent a third terminology, such that a third string query may be performed in the ternary tree and a third search result that is specific to the third terminology may be returned by identifying an inner nested array that corresponds to the third terminology for a particular node.

Figure 6:
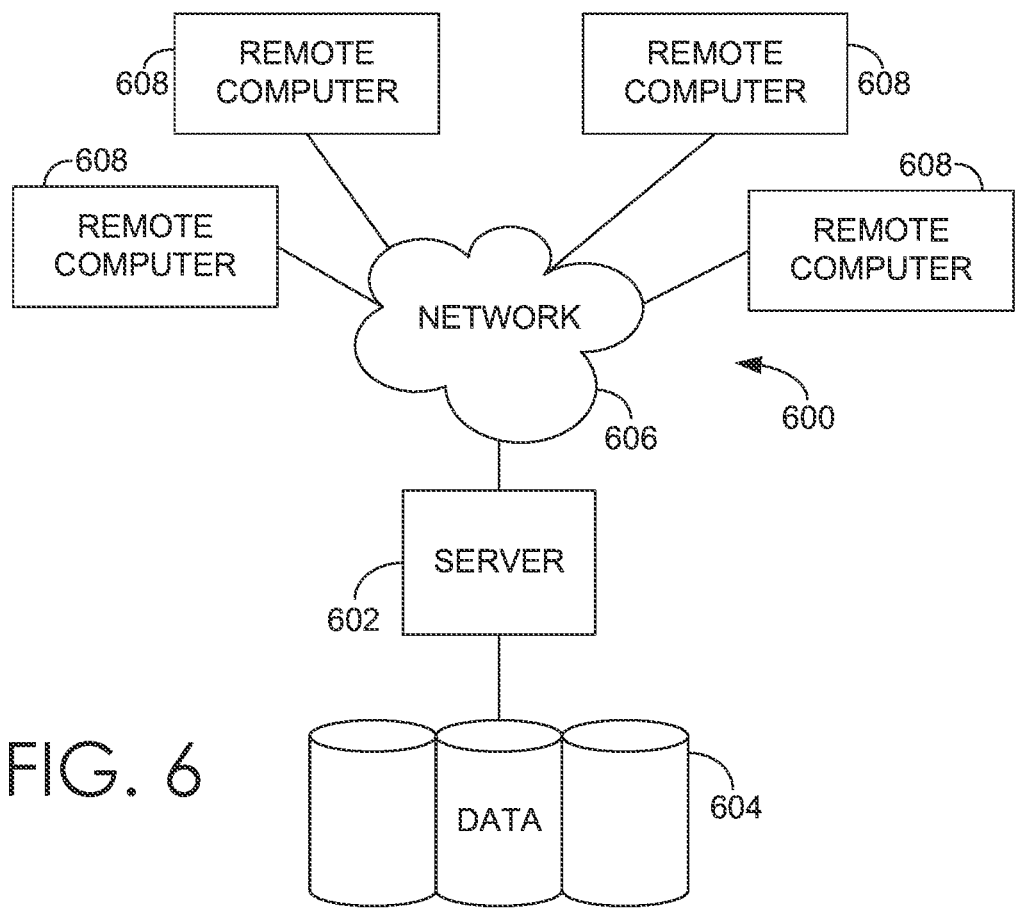
FIG. 6 is an example environment suitable to implement embodiments of the present invention.

Finally, turning to FIG. 6, an example environment 600 is depicted, in accordance with an embodiment of the present invention. It will be understood by those of ordinary skill in the art that the example environment 600 is just one example of a suitable computing environment and is not intended to limit the scope of use or functionality of the present invention. Similarly, the example environment 600 should not be interpreted as imputing any dependency and/or any requirements with regard to each component and combination(s) of components illustrated in FIG. 6. It will be appreciated by those having ordinary skill in the art that the connections illustrated in FIG. 6 are also exemplary as other methods, hardware, software, and devices for establishing a communications link between the components, devices, systems, and entities, as shown in FIG. 6, may be utilized in implementation of the present invention. Although the connections are depicted using one or more solid lines, it will be understood by those having ordinary skill in the art that the exemplary connections of FIG. 6 may be hardwired or wireless, and may use intermediary devices and/or components that have been omitted or not included in FIG. 6 for simplicity's sake. As such, the absence of devices and/or components from FIG. 6 should be not be interpreted as limiting the present invention to exclude additional components and combination(s) of components. Moreover, though devices and components are represented in FIG. 6 as singular devices and components, it will be appreciated that some embodiments may include a plurality of the devices and components such that FIG. 6 should not be considered as limiting the number of a device or component.

Continuing, the example environment 600 of FIG. is illustrated as being a distributed environment where components and devices may be remote from one another and may perform separate tasks. The components and devices may communicate with one another and may be linked to each other using a network 602. The network 602 may include wireless and/or physical (e.g., hardwired) connections. Exemplary networks include a telecommunications network of a service provider or carrier, Wide Area Network (WAN), a Local Area Network (LAN), a Wireless Local Area Network (WLAN), a cellular telecommunications network, a Wi-Fi network, a short range wireless network, a Wireless Metropolitan Area Network (WMAN), a Bluetooth® capable network, a fiber optic network, or a combination thereof. The network 602, generally, provides the components and devices access to the Internet and web-based applications.

The example environment 600 comprises a computing device 604 in the form of a server. Although illustrated as one component in FIG. 6, the present invention may utilize a plurality of local servers and/or remote servers in the example environment 600. The computing device 604 may include components such as a processing unit, internal system memory, and a suitable system bus for coupling to various components, including a database or database cluster. The system bus may be any of several types of bus structures, including a memory bus or memory controller, a peripheral bus, and a local bus, using any of a variety of bus architectures. By way of example, and not limitation, such architectures include Industry Standard Architecture (ISA) bus, Micro Channel Architecture (MCA) bus, Enhanced ISA (EISA) bus, Video Electronic Standards Association (VESA) local bus, and Peripheral Component Interconnect (PCI) bus, also known as Mezzanine bus.

The computing device 604 may include or may have access to computer-readable media. Computer-readable media can be any available media that may be accessed by the computing device 604, and includes volatile and non-volatile media, as well as removable and non-removable media. By way of example, and not limitation, computer-readable media may include computer storage media and communication media. Computer storage media may include, without limitation, volatile and nonvolatile media, as well as removable and non-removable media, implemented in any method or technology for storage of information, such as computer-readable instructions, data structures, program modules, or other data. In this regard, computer storage media may include, but is not limited to, Random Access Memory (RAM), Read-Only Memory (ROM), Electrically Erasable Programmable Read-Only Memory (EEPROM), flash memory or other memory technology, CD-ROM, digital versatile disks (DVDs) or other optical disk storage, magnetic cassettes, magnetic tape, magnetic disk storage, or other magnetic storage device, or any other medium which can be used to store the desired information and which may be accessed by the computing device 604. Computer storage media does not comprise signals per se.

Communication media typically embodies computer-readable instructions, data structures, program modules, or other data in a modulated data signal, such as a carrier wave or other transport mechanism, and may include any information delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above also may be included within the scope of computer-readable media.

In embodiments, the computing device 604 uses logical connections to communicate with one or more remote computers 606 within the environment 600. In embodiments where the network 602 includes a wireless network, the computing device 604 may employ a modem to establish communications with the Internet, the computing device 604 may connect to the Internet using Wi-Fi or wireless access points, or the server may use a wireless network adapter to access the Internet. The computing device 604 engages in two-way communication with any or all of the components and devices illustrated in FIG. 6, using the network 602. Accordingly, the computing device 604 may send data to and receive data from the remote computers 606 over the network 602.

Although illustrated as a single device, the remote computers 606 may include multiple computing devices. In an embodiment having a distributed network, the remote computers 606 may be located at one or more different geographic locations. In an embodiment where the remote computers 606 is a plurality of computing devices, each of the plurality of computing devices may be located across various locations such as buildings in a campus, medical and research facilities at a medical complex, offices or "branches" of a banking/credit entity, or may be mobile devices that are wearable or carried by personnel, or attached to vehicles or trackable items in a warehouse, for example.

In some embodiments, the remote computers 606 is physically located in a medical setting such as, for example, a laboratory, inpatient room, an outpatient room, a hospital, a medical vehicle, a veterinary environment, an ambulatory setting, a medical billing office, a financial or administrative office, hospital administration setting, an in-home medical care environment, and/or medical professionals' offices. By way of example, a medical professional may include physicians; medical specialists such as surgeons, radiologists, cardiologists, and oncologists; emergency medical technicians; physicians' assistants; nurse practitioners; nurses; nurses' aides; pharmacists; dieticians; microbiologists; laboratory experts; genetic counselors; researchers; veterinarians; students; and the like. In other embodiments, the remote computers 606 may be physically located in a non-medical setting, such as a packing and shipping facility or deployed within a fleet of delivery or courier vehicles.

Continuing, the example environment 600 comprises a data store 608. Although shown as a single component, the data store 608 may be implemented using multiple data stores that are communicatively coupled to one another, independent of the geographic or physical location of a memory device. Exemplary data stores may store data in the form of artifacts, server lists, properties associated with servers, environments, properties associated with environments, computer instructions encoded in multiple different computer programming languages, deployment scripts, applications, properties associated with applications, release packages, version information for release packages, build levels associated with applications, identifiers for applications, identifiers for release packages, users, roles associated with users, permissions associated with roles, workflows and steps in the workflows, clients, servers associated with clients, attributes associated with properties, audit information, and/or audit trails for workflows. Exemplary data stores may also store data in the form of electronic records, for example, electronic medical records of patients, transaction records, billing records, task and workflow records, chronological event records, and the like.

Generally, the data store 608 includes physical memory that is configured to store information encoded in data. For example, the data store 608 may provide storage for computer-readable instructions, computer-executable instructions, data structures, data arrays, computer programs, applications, and other data that supports the functions and action to be undertaken using the environment 600 and components shown in exemplary FIG. 6.

In a computing environment having distributed components that are communicatively coupled via the network 602, program modules may be located in local and/or remote computer storage media including, for example only, memory storage devices. Embodiments of the present invention may be described in the context of computer-executable instructions, such as program modules, being executed by a computing device. Program modules may include, but are not limited to, routines, programs, objects, components, and data structures that perform particular tasks or implement particular abstract data types. In embodiments, the computing device 604 may access, retrieve, communicate, receive, and update information stored in the data store 608, including program modules. Accordingly, the computing device 604 may execute, using a processor, computer instructions stored in the data store 608 in order to perform embodiments described herein.

Although internal components of the devices in FIG. 6, such as the computing device 604, are not illustrated, those of ordinary skill in the art will appreciate that internal components and their interconnection are present in the devices of FIG. 6. Accordingly, additional details concerning the internal construction device are not further disclosed herein.

Regarding FIGS. 1 through 6, it will be understood by those of ordinary skill in the art that the environment(s), system(s), and/or methods(s) depicted are not intended to limit the scope of use or functionality of the present embodiments. Similarly, the environment(s), system(s), and/or methods(s) should not be interpreted as imputing any dependency and/or any requirements with regard to each component, each step, and combination(s) of components or step(s) illustrated therein. It will be appreciated by those having ordinary skill in the art that the connections illustrated the figures are contemplated to potentially include methods, hardware, software, and/or other devices for establishing a communications link between the components, devices, systems, and/or entities, as may be utilized in implementation of the present embodiments. As such, the absence of component(s) and/or steps(s) from the figures should be not be interpreted as limiting the present embodiments to exclude additional component(s) and/or combination(s) of components. Moreover, though devices and components in the figures may be represented as singular devices and/or components, it will be appreciated that some embodiments can include a plurality of devices and/or components such that the figures should not be considered as limiting the number of a devices and/or components.

It is noted that embodiments of the present invention described herein with reference to block diagrams and flowchart illustrations. However, it should be understood that each block of the block diagrams and/or flowchart illustrations can be implemented in the form of a computer program product, an entirely hardware embodiment, a combination of hardware and computer program products, and/or apparatus, systems, computing devices/entities, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code can be performed sequentially such that one instruction is retrieved, loaded, and executed at a time. In some embodiments, retrieval, loading, and/or execution can be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Additionally, as should be appreciated, various embodiments of the present disclosure described herein can also be implemented as methods, apparatus, systems, computing devices/entities, computing entities, and/or the like. As such, embodiments of the present disclosure can take the form of an apparatus, system, computing device, computing entity, and/or the like executing instructions stored on a computer-readable storage medium to perform certain steps or operations. However, embodiments of the present disclosure can also take the form of an entirely hardware embodiment performing certain steps or operations.

Many different arrangements of the various components depicted, as well as components not shown, are possible without departing from the scope of the claims below. Embodiments of our technology have been described with the intent to be illustrative rather than restrictive. Alternative embodiments will become apparent readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. A computerized method, comprising:
   generating a plurality of nodes as a ternary tree data structure for characters of a plurality of terms specific to a first terminology;
   generating another plurality of nodes in the ternary tree data structure for characters of another plurality of terms specific to a second terminology that is different from the first terminology;
   determining that at least one of the plurality of nodes generated for the first terminology corresponds to at least one of the characters for the other plurality of terms specific to the second terminology; and
   generating, for each of the at least one of the plurality of nodes in the ternary tree data structure, a nested array that includes a first array having a term match value for the first terminology and a second array having a term match value for the second terminology, wherein the first and second arrays are nested in the nested array, and wherein the nested array supports a computerized search of the first and second terminologies in the ternary tree data structure.

2. The method of claim 1, wherein the plurality of nodes are arranged in the ternary tree data structure to represent the plurality of terms specific to the first terminology by connecting each node to at least one other node using at least one of a high pointer, an equal pointer, or a low pointer.

3. The method of claim 1, wherein the other plurality of nodes are arranged in the ternary tree data structure to represent the other plurality of terms specific to the second terminology by connecting each node to at least one other node using at least one of a high pointer, an equal pointer, or a low pointer.

4. The method of claim 1, further comprising determining that at least one other of the plurality of nodes generated for the first terminology does not correspond to at least one of the characters for the other plurality of terms specific to the second terminology.

5. The method of claim 4, wherein generating another plurality of nodes for the characters of the other plurality of terms specific to the second terminology comprises inserting an additional node into the ternary tree data structure for the at least one of the characters for the other plurality of terms specific to the second terminology.

6. The method of claim 5, further comprising generating, for the additional node inserted into the ternary tree data structure, a corresponding array storing a term match value.

7. A system comprising one or more processors and computer-readable storage media having computer-readable instructions embodied therein for execution by the one or more processors to perform operations, the operations comprising:
   generating a plurality of nodes for characters of a plurality of terms specific to a first terminology in a ternary tree data structure;
   generating another plurality of nodes for characters of another plurality of terms specific to a second terminology in the ternary tree data structure;
   determining that at least one of the plurality of nodes generated for the first terminology corresponds to at least one of the characters for the other plurality of terms specific to the second terminology; and
   generating, for each of the at least one of the plurality of nodes, a nested array that includes a first array having a term match value for the first terminology and a second array having a term match value for the second terminology, wherein the first and second arrays are nested in the nested array, and wherein the nested array supports a computerized search of the first and second terminologies in the ternary tree data structure.

8. The system of claim 7, wherein the plurality of nodes are arranged in the ternary tree data structure to represent the plurality of terms specific to the first terminology by connections of each node to at least one other node using at least one of a high pointer, an equal pointer, or a low pointer.

9. The system of claim 7, wherein the other plurality of nodes are arranged in the ternary tree data structure to represent the other plurality of terms specific to the second terminology by connections of each node to at least one other node using at least one of a high pointer, an equal pointer, or a low pointer.

10. The system of claim 7, wherein the operations further comprise determining that at least one other of the plurality of nodes generated for the first terminology does not correspond to at least one of the characters for the other plurality of terms specific to the second terminology.

11. The system of claim 10, wherein generating another plurality of nodes for the characters of the other plurality of terms specific to the second terminology comprises inserting an additional node into the ternary tree data structure for the at least one of the characters for the other plurality of terms specific to the second terminology.

12. The system of claim 11, wherein the operations further comprise generating, for the additional node inserted into the ternary tree data structure, a corresponding array storing a term match value.

13. One or more non-transitory media having computer-readable instructions embodied thereon that when executed perform operations, the operations comprising:
generating a ternary tree data structure having a plurality of nodes for characters of a plurality of terms specific to a first terminology and another plurality of nodes for characters of another plurality of terms specific to a second terminology; and
generating, for each of the plurality of nodes determined to correspond to at least one of the characters for the other plurality of terms specific to the second terminology, a nested array that includes a first array having a term match value for the first terminology and a second array having a term match value for the second terminology, wherein the first and second arrays are nested in the nested array, and wherein the nested array supports a computerized search of the first and second terminologies in the ternary tree data structure.

14. The one or more media of claim 13, wherein the plurality of nodes are arranged in the ternary tree data structure to represent the plurality of terms specific to the first terminology by connections of each node to at least one other node using at least one of a high pointer, an equal pointer, or a low pointer.

15. The one or more media of claim 13, wherein the other plurality of nodes are arranged in the ternary tree data structure to represent the other plurality of terms specific to the second terminology by connections of each node to at least one other node using at least one of a high pointer, an equal pointer, or a low pointer.

16. The one or more media of claim 13, wherein the operations further comprise determining that at least one other of the plurality of nodes generated for the first terminology does not correspond to at least one of the characters for the other plurality of terms specific to the second terminology.

17. The one or more media of claim 16, wherein generating the ternary tree data structure having the other plurality of nodes for the characters of the other plurality of terms specific to the second terminology comprises inserting an additional node into the ternary tree data structure for the at least one of the characters for the other plurality of terms specific to the second terminology.

18. The one or more media of claim 17, wherein the operations further comprise generating, for the additional node inserted into the ternary tree data structure, a corresponding array storing a term match value.

19. The one or more media of claim 13, wherein the operations further comprise performing a string query designated for the first terminology in the ternary tree data structure by traversing the plurality of nodes for characters of the plurality of terms specific to the first terminology to locate a first search result corresponding to the string query, the first search result corresponding to a node in the plurality of nodes, the node having a corresponding array storing at least a term match value for the first terminology.

20. The one or more media of claim 19, wherein the operations further comprise returning the first search result that is specific to the first terminology.

21. The one or more media of claim 20, wherein the operations further comprise locating a second search result corresponding to the other string query, the second search result corresponding to a particular node in the plurality of nodes or the other plurality of nodes, the particular node having a corresponding array storing at least a term match value of the second terminology.

22. The one or more media of claim 21, wherein the operations further comprise returning the second search result that is specific to the second terminology.

\* \* \* \* \*